June 24, 1930.  O. B. GOLDMAN  1,766,782
STRESS MEASURING DEVICE
Filed Jan. 30, 1928
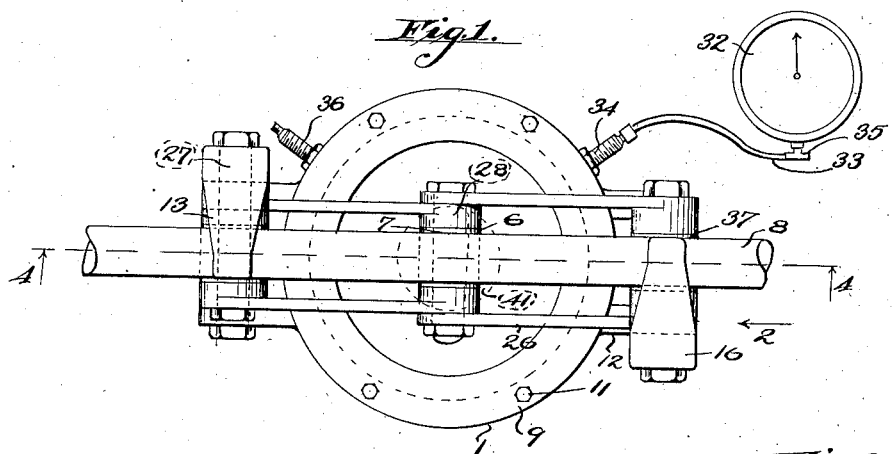

Patented June 24, 1930

1,766,782

UNITED STATES PATENT OFFICE

OTTO BERGER GOLDMAN, OF LONG BEACH, CALIFORNIA, ASSIGNOR TO MAY FETY GOLDMAN, OF LONG BEACH, CALIFORNIA

STRESS-MEASURING DEVICE

Application filed January 30, 1928. Serial No. 250,640.

This invention relates to precision instruments, and more particularly to a device for measuring the stress imposed upon flexible members such as cables, belts, wires, cords and the like. The present application is a continuation in part of my co-pending application, Serial No. 198,654, filed June 13, 1927.

An object of the invention is the provision of an instrument having means for measuring, indicating and recording the stress imposed upon a member under tension.

Another object of the invention is the provision of a device capable of measuring the tension imposed upon a member by deflecting the stressed member and imparting the side thrust resulting from the deflection to an enclosed fluid, and having means for measuring, indicating and recording the pressure thus imposed upon the fluid.

A further object is the provision of an indicator as above described, in which means are incorporated for compensating for pressure changes of said fluid, resulting from changes in temperature.

A further object is the provision of an indicator as above described, in which means for permitting slippage of the stressed member past those portions of the device bearing upon the stressed member to cause the deflection thereof. Thus I am enabled to avoid inaccuracies, when taking readings of the indicating means, which would otherwise be caused as a result of the friction between the stressed member and the deflecting means.

Another object is the provision of means for permitting movement of the stressed member in respect to the deflecting means so that the instrument might be used as a dynamometer to determine the stress imposed upon a moving belt or other moving stressed member. In addition to the above advantages resulting from the means for permitting relative movement of the deflecting means and the stressed member, I have largely eliminated friction therebetween which would otherwise quickly wear the deflecting clamps.

A further object is the provision of a device of the character described, in which the body of the fluid is contained in a compressible sack, so that a full floating action of the compressing piston is possible, and so that seepage of the fluid through the metal walls of the cylinder is prevented.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings wherein similar reference characters denote similar parts throughout:

Figure 1 is a front elevation of the stress indicator of my invention in position upon a cable.

Figure 2 is an end view of the indicating device, the direction of view being indicated by the arrow 2 of Figure 1.

Figure 3 is a vertical, sectional view, the plane of section being indicated by the line 3—3 of Figure 4, in the direction of the arrows.

Figure 4 is a vertical, sectional view, the plane of section being indicated by the line 4—4 of Figure 1, in the direction of the arrows.

Figure 5 is a detailed view of a modified form of the central deflector.

Figure 6 is a detailed view of a modified form of the outer deflectors.

In terms of broad inclusion the stress measuring, indicating and recording instrument of my invention comprises a chamber within which a piston is reciprocated to compress a fluid preferably contained within a compressible receptacle. A rod extends from the piston to engage the member, the tension of which it is desired to measure. Means are carried by the chamber for deflecting the member toward a chamber on opposite sides of the rod so that the side thrust resulting from the deflection is imparted through the rod and piston to the enclosed fluid; and means for measuring the pressure thus produced upon the fluid are included. This measuring means may be the conventional pressure indicator or recorder, or both, according to the requirements of the case. Means for compensating for pressure changes of the fluid resulting from variations of temperature are incorporated in the device; and means permitting movement of the stressed member past the deflecting means are also provided so as to obviate inexact readings which might result from friction between the clamping means and stressed member, and also obviate wear of the clamping means.

In greater detail the preferred embodiment of the measuring device of my invention comprises a chamber 1 within which a piston 2 is mounted for reciprocation. A compressible receptacle 3, such as a rubber sac, is contained within the chamber 1 beneath the piston 2 and adapted to be compressed thereby when the piston moves into the chamber. A rod 6 is carried by the piston 2 and extends from the chamber so that its outer end 7 is adapted to engage one side of the cable 8 or other member, the tension of which it is desired to measure. An annular flange 9 which may be secured to the end of the chamber 1 by screws 11 limits outward movement of the piston 2.

Means for deflecting the stressed member 8 toward the chamber on opposite sides of the rod 7 are provided, and comprise a bracket 12 on each side of the chamber 1 to each of which an arm 13 is pivoted by a pin 14. A clamp 16 is slidably retained upon each of the pins 14 in substantial parallelism with the associated arm 13, these clamps preferably being arranged on opposite sides of their respective arms as shown in Figure 1 and being extended so that their heads 18 are adapted to engage the other side of the stressed member 8 from that engaged by the rod 6. A screw 19 threaded through the other end 21 of each of the clamps 16 and revolubly retained within the associated arm 13, is provided with a handle 22 whereby the screw may be turned to tighten the head 18 upon the stressed member 8 and produce the deflection thereof toward the chamber 1 on each side of the rod 6. A link 26 is pivoted at one end to each of the arms 13 by a pin 27 and at the other end to the rod 6 by a pin 28; and the length of the arms 13 is such that the pins 27 are both the same distance from the plane of the piston 2 and closer to that plane than is the pin 28, so that the links 26 are angularly disposed as clearly shown in Figure 4.

It is to be understood from the above described construction that the device may be positioned upon a cable 8 with the cable extending between the two clamps 16 past the end 7 of the rod 6. Then by tightening both the screws 19 the heads 18 of the clamps 16 will deflect the cable toward the chamber 1 on opposite sides of the rod 6 so that the side thrust resulting from such deflection will cause the piston 2 to slide into the chamber 1 and compress the receptacle 3. A fluid 31, preferably a non-compressible fluid such as glycerine or water, is contained within the receptacle 3; and any suitable means for determining the pressure thus imposed upon the fluid are provided, such as a conventional pressure gauge 32 connected by a tube 33 to an outlet 34, extending through the side of the chamber 1 to establish communication with the interior of the receptacle 3. An inlet 36, preferably provided with a conventional check valve, also extends through the chamber 1 and establishes communication with the interior of the receptacle 3 to afford convenient means for filling the reservoir tube 33 and the tube of the indicating gauge 32. An air vent 35 in the tube 33 facilitates filling.

In order to obtain an accurate reading it is, of course, necessary to deflect the cable 8 a predetermined distance. Proper amount of deflection may be easily obtained by tightening the screws 19 until the cable 8 contacts the ends 37 of the arms 13 which are suitably enlarged surrounding the pins 27 so as to establish a larger surface against which the cable 8 may be clamped.

The purpose of the links 26 is to maintain the distance between the deflecting point 7 and each of the two deflecting points 37 always constant. Consider the isosceles triangle having for its base the distance between the two outer deflecting points 37 and for its altitude the distance between the deflecting point 7 and the point of intersection of the longitudinal axis of the rod 6 with the base. Whenever variation in the tension of the stressed member 8 occurs, there will be produced a proportional movement of the rod 6, and a corresponding variation in the altitude of the triangle. The length of the base is permitted to vary through the expedient of the pivotal mountings 14 of the arms 13, the two sides of the triangle being maintained constant by the links 26. Such change in tension will, of course, produce a change in the amount that the member 8 is strained, or a change in the length of that portion of the member 8 between the two clamps 16 unless the links 26 are included to prevent displacement of the ends 37 in respect to the end 7 of the rod 6 and cause such change in length to be compensated for by slippage of the member 8 past the ends 18 of the clamps.

In Figures 5 and 6 a modification is shown which might be employed to serve the same purpose as the links 26, or which might advantageously be employed in conjunction therewith. In this modification the arms 13' are rigidly attached to the brackets 12 and the pins 27' have revolubly mounted upon them rollers 37' which in this modification serve as the stops to limit the deflection of the member 8'. The ends of the clamps 16' are in the form of pins upon which rollers 18' are revolubly mounted so as to facilitate movement of the member 8' therepast. Similarly the pin 28' carried by the rod 6 has mounted upon it a roller 7' adapted to bear against the member 8' intermediate the two rollers 37' and slightly displaced therefrom. Another advantage of this modification in addition to compensating for slippage of the member 8' past the deflecting means, is that it may in this form be used upon a stressed member 8' which is moving in relation to the measuring device, such as a belt or the like, and thus used as a dynamometer to measure the force being exerted by the stressed member.

A portion of one wall of the chamber 1 is formed by a plate 41 movable in respect thereto by an adjusting screw 42 having its inner end in engagement with the plate 41 and threaded through a bracket 43 rigid with the chamber 1. This movable plate provides convenient means for compensating for variations in pressure of the fluid 31, resulting from variations in temperature, and which would otherwise tend to produce inaccuracies in the reading of the indicating and recording instruments.

The operation of my device is substantially as follows:

The indicating gauge 32 should first be observed to determine whether or not the hand points directly to the zero mark when the instrument is not positioned upon the stressed member. If this is not the case the proper adjustment may be obtained by manipulating a screw 42 to increase or decrease the pressure of a fluid 31, as the requirements of the case shall dictate. Then the device is positioned upon the stressed member 8, as previously described, and the screws 22 tightened until the ends 18 of the clamps 16 pull the member 8 into contact with the ends 37 of the arms 13, or the rollers 37', depending upon which modification of the device is being employed. Owing to the displacement of the end 7 of the rod 6 from a line joining the ends 37 of the arms 13 a deflection in the member 8 will thus be produced; and if the member 8 is under tension a side thrust will be produced against a rod 6 to compress the receptacle 3 and its contained fluid, increasing the pressure thereof. This pressure will be communicated to and indicated by the pressure gauge 32 or to a recording instrument in the event that such is the type of instrument being employed, or both. The relation between the indicated or the recorded pressure, as the case may be, and the tension in the member 8 is given by the calibration curve of the device obtained by calibration in the usual manner.

I claim:

1. A device for measuring the stress imposed upon a member, comprising a chamber, a piston reciprocal within said chamber, a receptacle of flexible material disposed within and conforming to said chamber and piston, a rod carried by said piston and extending from the chamber to engage said stressed member, means for deflecting said stressed member towards said chamber on opposite sides of said rod, a fluid in said receptacle, and means for measuring the pressure of said fluid.

2. A device for measuring the stress imposed upon a member, comprising a chamber, a piston reciprocal within said chamber, a receptacle of flexible material disposed within and conforming to said chamber and piston, a rod carried by said piston and extending from the chamber to engage said stressed member, means for deflecting said stressed member towards said chamber on opposite sides of said rod, a fluid in said receptacle, means for measuring the pressure of said fluid, and means for compensating for pressure changes of said fluid.

3. A device for measuring the stress imposed upon a member, comprising a chamber, a piston reciprocal within said chamber, a receptacle of flexible material disposed within and conforming to said chamber and piston, a rod carried by said piston and extending from the chamber to engage said stressed member, means for deflecting said stressed member towards said chamber on opposite sides of said rod, a fluid in said receptacle, means for measuring the pressure of said fluid, and means for permitting longitudinal movement of said stressed member in respect to said measuring device while deflected.

4. A device for measuring the stress imposed upon a member, comprising a chamber, a compressible receptacle in said chamber, a piston reciprocal within said chamber and adapted to compress said compressible receptacle, a rod carried by said piston and extending from the chamber to engage said stressed member, means for deflecting said stressed member towards said chamber on opposite sides of said rod, a fluid in said receptacle, and means for measuring the pressure of said fluid.

5. A device for measuring the stress imposed upon a member, comprising a chamber, a compressible receptacle in said chamber, a piston reciprocal within said chamber and adapted to compress said compressible receptacle, a rod carried by said piston and extending from the chamber to engage said stressed member, means for deflecting said stressed member towards said chamber on opposite sides of said rod, a fluid in said receptacle, means for measuring the pressure of said fluid, and means for compensating for pressure changes of said fluid.

6. A device for measuring the stress imposed upon a member, comprising a chamber, a compressible receptacle within said chamber, a piston reciprocal within said chamber and adapted to compress said compressible receptacle, a rod carried by said piston and extending from the chamber to engage one side of said stressed member, a pair of brackets extending from said chamber on opposite sides thereof, a clamp pivoted to each of said brackets and adapted to engage the other side of said stressed member, means for tightening said clamps to deflect said member towards said chamber on opposite sides of said rod, a fluid in said receptacle, and means for measuring the pressure of said fluid.

7. A device for measuring the stress imposed upon a member, comprising a chamber, a compressible receptacle within said chamber, a piston reciprocal within said chamber and adapted to compress said compressible receptacle, a rod carried by said piston and extending from the chamber to engage one side of said stressed member, a pair of brackets extending from said chamber on opposite sides thereof, a clamp pivoted to each of said brackets and adapted to engage the other side of said stressed member, means for tightening said clamps to deflect said member towards said chamber on opposite sides of said rod, a fluid in said receptacle, means for measuring the pressure of said fluid, and means for compensating for pressure changes of said fluid.

8. A device for measuring the stress imposed upon a member, comprising a chamber, a compressible receptacle within said chamber, a piston reciprocal within said chamber and adapted to compress said compressible receptacle, a rod carried by said piston and extending from the chamber to engage one side of said stressed member, a pair of brackets extending from said chamber on opposite sides thereof, a clamp pivoted to each of said brackets, a roller revolubly mounted on each of said clamps and engaging the other side of said stressed member, means for tightening said clamps to deflect said member towards said chamber on opposite sides of the rod, a fluid in said receptacle, and means for measuring the pressure of said fluid.

9. A device for measuring the stress imposed upon a member, comprising a chamber, a compressible receptacle within said chamber, a piston reciprocal within said chamber and adapted to compress said compressible receptacle, a rod carried by said piston and extending from the chamber to engage one side of said stressed member, a pair of brackets extending from said chamber on opposite sides thereof, a clamp pivoted to each of said brackets, a roller revolubly mounted on each of said clamps and engaging the other side of said stressed member, means for tightening said clamps to deflect said member towards said chamber on opposite sides of the rod, a fluid in said receptacle, means for measuring the pressure of said fluid, and means for compensating for pressure changes of said fluid.

10. A device for measuring the stress imposed up on a member, comprising a chamber, a piston reciprocal within said chamber, a compressible receptacle within said chamber and adapted to be compressed by said piston, a rod carried by said piston and extending from the chamber to engage one side of said stressed member, a pair of brackets extending from said chamber on opposite sides thereof, a clamp pivoted to each of said brackets and adapted to engage the other side of said stressed member, means for tightening said clamps to deflect said member toward the chamber on opposite sides of the rod, a link pivoted at one end to each of said clamps and at the other end to said rod, a fluid in said receptacle, and means for measuring the pressure of said fluid.

11. A device for measuring the stress imposed upon a member, comprising a chamber, a piston reciprocal within said chamber, a compressible receptacle within said chamber and adapted to be compressed by said piston, a rod carried by said piston and extending from the chamber to engage one side of said stressed member, a pair of brackets extending from said chamber on opposite sides thereof, a clamp pivoted to each of said brackets and adapted to engage the other side of said stressed member, means for tightening said clamps to deflect said member toward the chamber on opposite sides of the rod, a link pivoted at the end to each of said clamps and at the other end to said rod, a fluid in said receptacle, means for measuring the pressure of said fluid, and means for compensating for pressure changes of said fluid.

In testimony whereof I have signed my name to this specification.

OTTO BERGER GOLDMAN.